MULTIPLE STATION RANDOM ACCESS STORAGE AND RETRIEVAL DEVICE

INVENTOR
EUGENE H. IRASEK
BY Zulwider, Patton, Rieber, Lee, and Utecht
ATTORNEYS

MULTIPLE STATION RANDOM ACCESS STORAGE AND RETRIEVAL DEVICE

INVENTOR
EUGENE H. IRASEK
BY Zulueder Patton Rieber Lee, and Utecht
ATTORNEYS

INVENTOR.
EUGENE H. IRASEK
BY Zulyrider, Patton, Rieber, Lee, and Utecht
ATTORNEYS United States Patent Office 3,438,000

Patented Apr. 8, 1969

3,438,000
MULTIPLE STATION RANDOM ACCESS STORAGE AND RETRIEVAL DEVICE

Eugene H. Irasek, Inglewood, Calif., assignor to HF Image Systems, Inc., Culver City, Calif., a corporation of California Continuation-in-part of application Ser. No. 528,231, Feb. 17, 1966. This application July 7, 1966, Ser. No. 563,514

Int. Cl. G11b *13/00*

U.S. Cl. 340—172.5 17 Claims

ABSTRACT OF THE DISCLOSURE

A random access storage and retrieval device for card type items having a delivery station at which a previously addressed and selected card is withdrawn from the store and returned thereto after use and which provides for completely automatic operation in returning an old card to the store, selecting a new card and locating it at the delivery station, and withdrawing the card from the store, all under the control of the X direction motion. A plurality of such stations are provided at which the cards may be recalled as desired, card selecting and positioning devices and X, Y positioning mechanisms being duplicated for each station. The stations are interlocked to prevent operation of a second station while another station is conducting a sequence of card manipulation although cards may be addressed without selection regardless of another station conducting a sequence. Priority orders of access to the store are provided between the stations, whereby a station of higher priority initiates its sequence of operation prior to that of a station of lower priority when both stations desire access to the store at the same time.

This is a continuation-in-part of application Ser. No. 528,231, filed Feb. 17, 1966, for Random Access Storage and Retrieval Device.

The present invention relates to a random access storage and retrieval device for a large number of items such as cards and the like providing a plurality of stations at which the items may be recalled individually, independent of other items, and in any desired order regardless of their location in the store. This invention is particularly useful in library type operations and provides for the simultaneous use of the store by a plurality of operators.

A feature of this invention lies in the completely automatic operation at a delivery station under the control of the X directional motion, whether or not a plurality of stations are provided.

The operations at a plurality of stations are substantially identical in selecting and recalling an item for reading, projecting, printing or the like at each of the plurality of stations associated with the store. The operation at each proceeds automatically to return an old card to the store, select a new card from the store and withdraw the new card, then returning the control and manipulation of the store to the other stations.

For ease in terminology in describing the present invention the items to be stored will be referred to generally as "cards," which term is intended to cover many different types of items including, without limitation, ledger cards, magnetic cards, optical cards, punch cards, tapes, keys, slides, film cards, microfiche, microfilm jackets, and the like, one specific example being a transparent sheet "card" carrying as many as one hundred or more individual film images or the like.

The storage of cards in the device according to the present invention is desirably in random positions so that they may be returned to the store at the position it temporarily occupies opposite the station from which the card is returned, without indexing the store with the station. As disclosed more in detail in the parent application the cards themselves are provided with identification means, specifically by means of notches at the forward edges of the cards which are located according to any desired code such as standard binary, binary coded decimal, grey binary, octal and like codes which permit each individual card to be addressed by its identifying number and retrieved from a random storage position.

The selector and sensor devices disclosed in the parent application are herein duplicated at each of the stations associated with the store, as are the card indexing and separating means facilitating the withdrawal and return of the cards with respect to the store. The X, Y positioning mechanisms are likewise duplicated at the stations, of which the X directional motion for withdrawing and returning the cards is particularly illustrated, it being understood that any additional X directional manipulation and any Y directional mechanism may be used within the consideration of the present invention.

The operations at the various stations for selecting and manipulating the cards with respect to the store are desirably interlocked to prevent interference between the various stations should simultaneous access to the store be atempted. Once any station is locked to the store and a sequence of operation initiated, no other station may enter the store until the sequence is completed. This is referred to as "condition priority." Where several stations attempt access to the store at the same time, a fixed order or "serial priority" interlock is provided in which the stations have orders of priority, with the initiating station of highest priority securing access to the store before stations of lower orders of priority.

It is therefore a primary object of this invention to provide an improved random access storage and retrieval device having a plurality of stations associated with the store at each of which access to cards within the store may be secured.

Another object of this invention is the provision of an improved random access storage and retrieval device including a plurality of stations operating with respect to a common store in which cards from the store may be withdrawn at each of the stations and in which withdrawn cards may be in any or all of the stations at the same time to permit simultaneous card usage.

Another object of this invention is the provision of an improved random access storage and retrieval device having a plurality of stations associated with a common card store in which cards may be manipulated with respect to the store at each of the stations and in which the stations are interlocked to prevent conflict between the stations in their access to the store.

A further object of this invention is a multiple station random access storage and retrieval device in accordance with the immediately preceding object providing both condition priority interlock and serial priority interlock between the stations.

A still further object of this invention is the provision of an improved random access storage and retrieval device providing completely automatic operation at a delivery station under the control of the X directional motion to return an old card and select and withdraw a new card from the card store.

These and other objects and features of the invention will be apparent to those skilled in the art from the following specification and the appended drawings in which.

Figures 1, 2, 3:
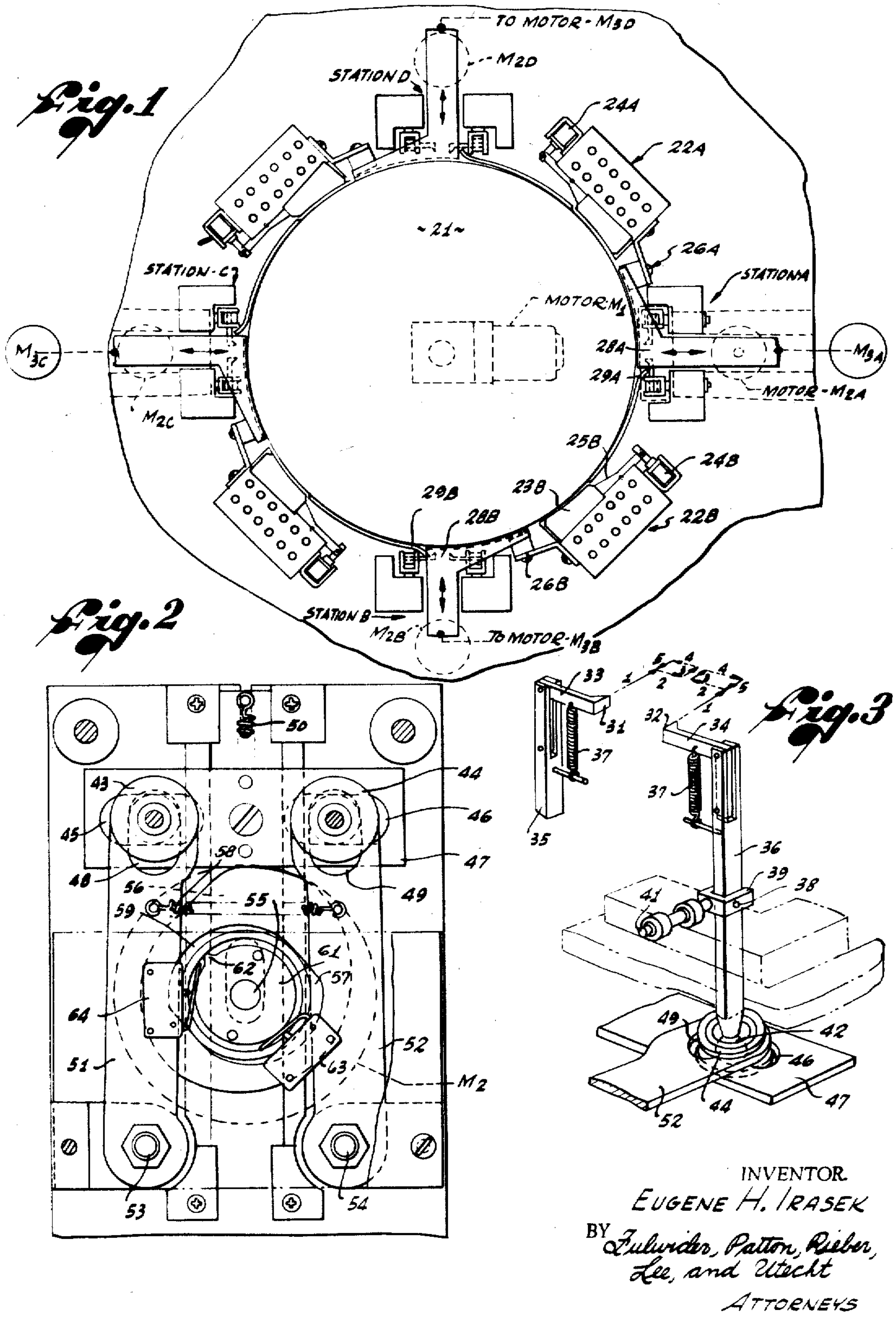
FIGURE 1 is a plan view of a random access storage and retrieval device with multiple stations according to the present invention.
FIGURE 2 is a generally horizontal sectional view showing the operating mechanism for the card indexing and separating mechanisms at each of the stations.
FIGURE 3 is a partial view in perspective of the card indexing and separating mechanisms at the stations showing the numbered movements of the card engaging wedges of the mechanism.
Figure 4:
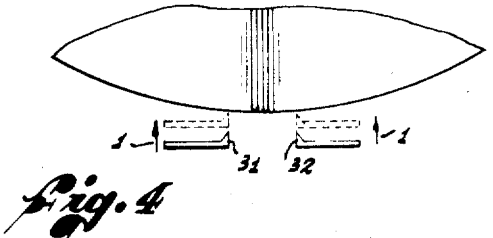
FIGURES 4–12 are diagrammatic representations of the various movements of the card indexing and separating wedges of FIGURE 3, as operated by the mechanism of FIGURE 2.
Figure 5:
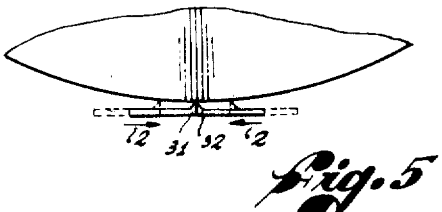
Figure 6:
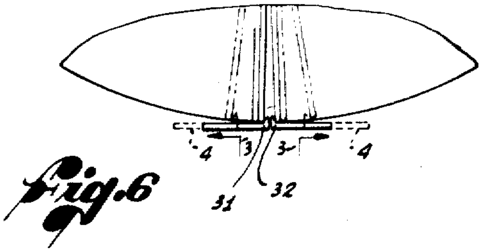

Referring to FIGURE 1, the cards are stored within a cylindrical drum 21 and access is had to the card edges at the periphery of the drum at the stations located therearound, in this embodiment four in number and designated station A, station B, station C and station D. Each station is provided with a selector 22A, 22B, etc., which includes coding means for addressing the cards within the store 21 according to the coded notches in the forward edges of the cards, as described more in detail in the parent application. The addressed cards are partially withdrawn from the store at each selector by means of arcuate nonconcentric magnets 23A, 23B, etc., for the various stations. Each selector is provided with a solenoid operator 24A–24D for holding the cards in the store against withdrawal by the magnets. For this purpose the solenoids operate arms 25A–25D, which hold the cards within the store. Each station is provided with a sensor 26A–26D of any desired form and which may include a normally open reed switch 27A–27D, 27A being shown in the wiring diagram of FIGURE 13. The card store drum 21 is rotated in a clockwise direction, as shown in FIGURE 1, by a motor $M_1$.

Each station is provided with a card-engaging and manipulating member 28A, 28B, etc., like the parts 37, 38 in the parent application and each individually driven in the X horizontal direction by a motor $M_{3A}$–$M_{3D}$. The cards returned into the drum store at each station are pushed completely within the store by guide rails 29A–29D as the drum rotates.

Referring more particularly to FIGURES 2 and 3, the cards are indexed and separated at the various stations A–D by any desired mechanism such as wedges 31, 32 mounted at the adjacent ends of arms 33, 34 which are pivotally mounted on the ends of generally vertical arms 35 and 36, respectively. The arms 33 and 34 are held in generally horizontal position by means of biasing springs 37. Each of the arms 35 and 36 is pivoted about an axis 38 in a bracket 39 which is itself pivoted about an axis 41 at right angles to the axis 38. The lower ends of the arms 35 and 36 have ball-like termini 42 received in complementary sockets within spool-like members 43 and 44. The hub of each spool-like member 43, 44 is received within a pair of slots extending at right angles to each other to give universal horizontal motion to the members. One slot of each pair is comprised by one of slots 45 and 46 in across-bar 47 movable in the X direction of its station, with the slots 45 and 46 extending at right angles to the X direction. The other slots of each pair is comprised by one of slots 48 and 49 extending parallel to the X direction at each station and disposed in the ends of spaced pivotal arms 51 and 52 having stationary pivots at 53 and 54.

A vertical shaft 55 for each station is rotated by a motor $M_{2A}$–$M_{2D}$. Upon the shaft 55 are rigidly secured a plurality of superimposed cams of which a cam 56 bears against the cross-bar 47 to effect movement thereof in the inward X direction against the bias of return spring 50. A cam 57 bears against the arm 51 to move it against the bias of spring 58. A cam 59 bears against arm 52 to move it against the bias of spring 58. A cam 61 has an operating projection 62 for actuating a pair of stationarily mounted electric switches 63 and 64. The motor $M_{2A}$–$M_{2D}$ at each station drives the cams 56, 57 and 59 to effect the movements of the card-indexing and manipulating wedges 31 and 32 indicated by the numbers 1–5 in FIGURE 3. The projection 62 on cam 61 effects the operations of the switches 63 and 64 in the wiring diagram of FIGURE 13.

Figure 13:
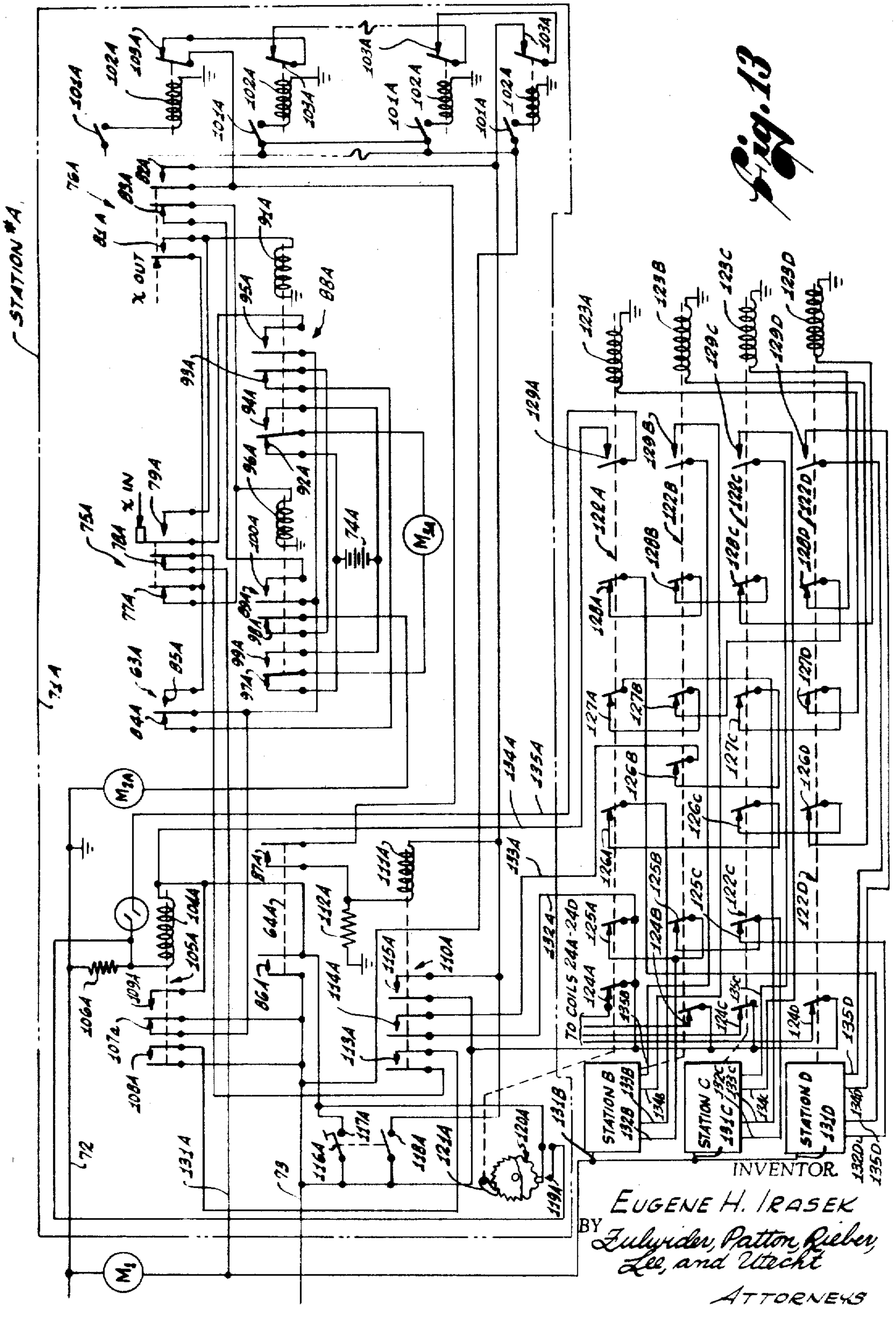
FIGURE 13 is a wiring diagram for one of the stations and of the interlocking circuitry between the duplicated stations.

Referring to FIGURE 13, the switching and control elements shown within the outline 71A are duplicated for each of the stations at which access is had to the card store, the elements within the outline 71A for station A being duplicated in the blocks indicating stations B, C and D at the lower left-hand portion of FIGURE 13. General power to the system is supplied from the lines 72 and 73, of which the line 72 is indicated as grounded to simplify the connections throughout the system which are indicated as completed to the line 72 through the common ground. A second source of power for each station is indicated at the battery 74A to simplify the reversals of the directions of rotation of the motor $M_{3A}$ which moves the card manipulator 28A toward and away from the drum 21 in the X direction. The card manipulator 28A operates a pair of multiple limit switches at its opposite extremes of movement, a limit switch 75 in its inward position toward the drum 21 and a limit switch 76 in its outermost position away from the drum. Limit switches 75 and 76 are shown in the positions they assume when the card manipulator 28A is in its innermost position. For limit switch 75 this closes contacts 77 and 78 and opens contacts 79; for limit switch 76 this opens contacts 81 and 82 and closes contact 83.

Switch 63A is a double-throw, momentary operationed switch having normally closed contacts 84A and normally open contacts 85A. Switch 64A is a double-pole, normally open switch having normally open contacts 86A and 87A.

A pair of relays 88A and 89A are associated with the X driving motor $M_{3A}$, relay 88A having an operating coil 91A connected to contacts 79A and 81A, normally closed contacts 92A and 93A, and normally open contacts 94A and 95A. Relay 89A has an operating coil 96A connected to contacts 77A and 83A, normally closed contacts 97A and 98A, and normally open contacts 99A and 100A.

The selector 22A is addressed through contacts 101A which control the energization of encoding solenoid coils 102A which also open normally closed contacts 103A. The solenoid coils 102A locate the address plates with respect to the front edge notches of the cards to address a unique card in the store, as more fully explained in the parent application.

The reed switch 27A and the operating coil 104A of a relay 105A are connected to the ground line 72 through a limiting resistor 106A. The relay 105A has a normally closed contact 107A and normally open contacts 108A and 109A. Relay 110A has its operating coil 111A connected to ground through a limiting resistor 112A. Relay 110A has three normally open contacts 113A, 114A and 115A. A double-pole push button 116A has normally open contacts 117A and 118A.

A step switch 120A having normally open contacts 119A is stepped by a pawl 121A operated by the armature of a relay 122A having an operating coil 123A. Relay 122A has normally closed contacts 124A controlling solenoid 24A, normally closed interlocking contacts 125A–128A and normally open contacts 129A which close to put reed switch 27A in circuit. The step switch 120B for station B is operated by the armature of an interlocking relay 122B having an operating coil 123B, normally closed contacts 124B–128B and normally open contacts 129B. The step switch 120C of station C is operated by the armature of a relay 122C having an operating coil 123C, normally closed contacts 124C–128C, and normally open contacts 129C. Step switch 120D of station D is operated by the armature of a relay 122D having an operating coil 123D, normally closed contacts 124D and 126D–128D, and normally open contacts 129D.

Motor $M_1$ is connected to the grounded line 72 on one side and its opposite side is connected to lines 131A, 131B, 131C and 131D of the respective stations. Station A is connected into the interlock circuitry by lines 132A, 133A, 134A and 135A and stations B, C and D are connected into the interlocking circuitry by comparable lines 132B, C, D; 133B, C, D; 134B, C, D; and 135B, C, D.

In describing the sequence of operation of a delivery station according to the present invention it will be assumed that station A has withdrawn a card from the store, has completed its use thereof and now desires to return the old card to the store and to secure a new card therefrom. When the card was withdrawn from the store the card-manipulating member 28A was moved outwardly in the X direction by the motor $M_{3A}$, thus operating limit switches 75A and 76A to the opposite of the positions shown in FIGURE 13. In the initial outward movement of member 28A contacts 77A and 78A open and then contact 79A closes. At its extreme outward position limit switch 76A operates to close contacts 81A and 82A and open contact 83A.

To return the old card and secure a new card the station A operator first addresses the new card by means of the switches 101A in accordance with the code number of the card desired. He then closes the "start" push button 116A momentarily to close contacts 117A and 118A. Closing of contact 118A energizes coil 111A of relay 110A which operates to close a holding circuit at contacts 115A about the push button contact 118A and also to close contacts 113A and 114A. Closing of contact 114A energizes coil 123 of relay 122A through the contacts 126B, 127C, and 127D. Relay 122 now operates to open contacts 124A–128A, close contact 129A, and step switch 120A.

All of selectors 22A–22D were inoperative because of the energization of coils 24A–24D through the normally closed contacts 124A–124D. The opening of contacts 124A de-energizes solenoid 24A and permits the selector 22A to withdraw an address card forwardly of the store by its magnets 23A. Opening of contacts 125A–128A prevents the energization of any of operating coils 123B, 123C or 123D while station A is conducting the sequence of returning its old card and securing a new card. Closing of contact 129A places the reed switch 27A in a circuit to short out coil 104A when the reed switch closes.

At the initiation of this operating cycle energizing coil 104A of relay 105A was energized through its holding contacts 109A and in this energized position contacts 108A are closed and contacts 107A open. When relay 122A stepped switch 120A it momentarily closed contacts 119A to short out coil 104A so that relay 105 opens to place the contacts thereof shown in the positions shown in FIGURE 13.

Figure 7:
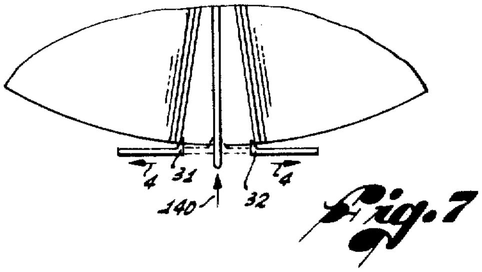

Motor $M_{2A}$ is now energized through contacts 98A, 93A, 84A and 107A. This rotates the cams on shaft 55 at station A and moves the wedges 31 and 32 of station A through the motions 1, 2, 3 and 4 of FIGURES 3 through 7, after which operator 62 on cam 61 operates switch 63A to open contact 84A and close contact 85A momentarily. Closing of contact 85A energizes coil 91A of relay 88A through contacts 107A and 81A. Operation of relay 88A closes a holding circuit through contacts 79A and 95A so that opening of contact 85A is ineffective. Closing of contacts 94A energizes motor $M_{3A}$ from the battery 74A so that it moves the card manipulating member 28A inwardly to insert the old card into the drum store, as indicated by the arrow 140 in FIGURE 7. Operation of relay 88A also opened contact 93A to make the closing of contact 84A ineffective.

As soon as member 28A starts inwardly, limit switch 76A operates into the contact positions shown in FIGURE 13. When the member 28A reaches its innermost position with the old card inserted into the store in the position of FIGURE 7, limit switch 75A operates into the position shown in FIGURE 13, first opening contact 79A to de-energize the operating coil 91A of relay 88A which drops out to open contact 94A and de-energize motor $M_{3A}$. The drop out of relay 88A re-closes contact 93A, thus again energizing motor $M_{2A}$ through contacts 84A.

Figure 8:
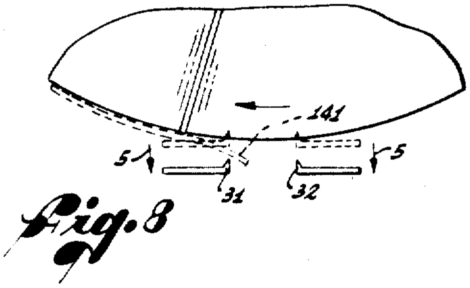

Motor $M_{2A}$ now rotates the cams on the shaft 55 at station A to withdraw the wedges 31, 32 through motion 5 into the position of FIGURE 8. Motor $M_{2A}$ is de-energized when the operator 62 on cam 61 operates switch 64A whereby the closing of contact 86A energizes coil 104A of relay 105A which closes to open contact 107A. Relay 104A remains energized through the holding circuit provided by contact 109A.

At this time drum motor $M_1$ is energized through contacts 78A, 113A, and 108A. The drum 21 therefore rotates and the new card addressed in selector 22A is pulled partially out of the store by the magnets 23A and its presence is sensed when it is opposite the sensor 26A to close reed switch 27A. When motor $M_1$ was energized, the wedges 31 and 32 were in the position of FIGURE 8 and rotation of the drum store 21 engaged the edge of the returned card with the rail 141 to move the card fully back into the store.

Figure 9:
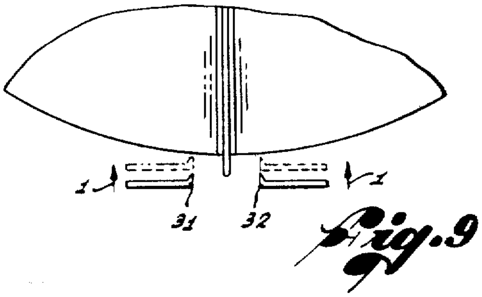

When the reed switch 27A closes it shorts out coil 104A of relay 105A which thereby drops out to de-energize motor $M_1$, the drum 21 coasting or being braked to a stop with the new selected card positioned in station A in engagement with the manipulating member 28A and substantially centered at the station, as in FIGURE 9.

Figure 10:
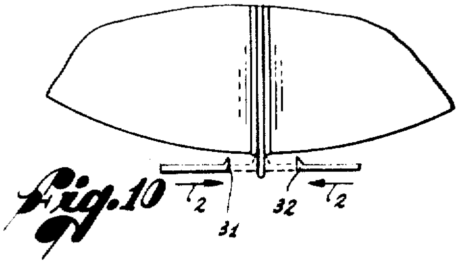
Figure 11:
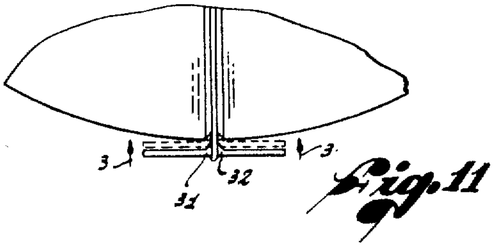
Figure 12:
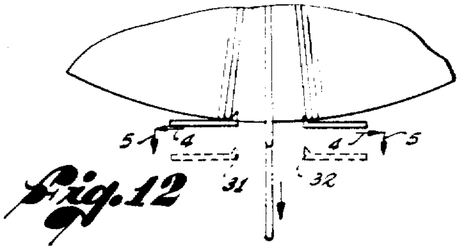

Closing of contacts 107A energizes motor $M_{2A}$ through contacts 84A, 93A and 98A and its associated cams move the wedges 31 and 32 at station A partially inwardly in motion 1 of FIGURES 3 and 9, then together in motion 2, FIGURE 10, then inwardly in motion 3, FIGURE 11, and then apart as in motion 4, FIGURE 12. Motor $M_2$ is then de-energized with the wedges 31, 32 in their inward but separated position, full line FIGURE 12, by the operation of switch 63A by operator 62 on cam 61. The operating coil 96A of relay 89A is now energized, forms its own holding circuit through contact 100A, energizes motor $M_{3A}$ through contact 99A and renders contacts 84A ineffective by opening contact 98A. Motor $M_{3A}$ now rotates in the reverse direction by being connected in opposite polarity to the battery 74A and draws the card manipulating member 28A outwardly in the X direction to remove the new selected card from the store. As member 28A starts moving outwardly limit switch 75A operates its contacts to the reverse of the positions shown in FIGURE 13. When member 28A reaches its extreme outward position relay 76A operates its contacts to the reverse of the positions shown in FIGURE 13, thus opening contact 83A to de-energize coil 96A of relay 89A which drops out to de-energize motor $M_{3A}$. Closing of contact 98A now energizes motor $M_{2A}$ whose cams rotate to move the wedges 31, 32 into the dotted line position of FIGURE 12. Switch 64A is now operated by 62 on cam 61 to close contact 86A and energize coil 104A of relay 105A. Operation of relay 105A open contact 170A to de-energize motor $M_{2A}$ and forms a holding circuit for its coil 104A through contact 109A. Closing of contact 108A has no effect on motor $M_1$ because contact 78A is open.

Operation of switch 64A also closes contact 87A and, since contact 82A is closed, coil 111A is shorted out so that relay 110A drops open to open all of contacts 113–115A. This de-energizes the operating coil 123A of relay 122A in the interlocking circuits and relay 122A drops out to return the contacts thereof to the positions shown in FIGURE 13. Any of the stations, B, C, and D whose push-button 116 has been or now is operated, after insertion of the address of a new card in its switches 101, initiates a sequence as above-described for the station whose push-button 116 was operated. It will be understood that the operation of relay 122 of that station will open the interlocking circuits to produce "condition priority" interlock and prevent actuation of the mechanism at any other station while the one in question is proceeding with its sequence of returning an old card and selecting and withdrawing a new card from the store.

In "condition priority" interlock, one of the stations will be locked to the store and will prevent any other station from being energized while the locked station is effecting its sequence of operation. In addition, the interlock circuitry provides for "serial priority" in the event that more than one station attempts to enter the store at the same time. By the switches 125A, 125B and 125C there is provided a serial priority interlock distinct from the condition priority interlock whereby the highest in order of priority of a plurality of stations wanting access to the store will secure it before stations of lower order of priority. Thus, if stations A, B, C and D all desire access to the store at the same time, station A will secure it since the opening of its contact 125A cuts off the circuits through the following contacts 125B and 125C to lines 132B, C and D. Similarly, if stations C and D try to enter the store at the same time, station C enters and its contact 125C opens the circuit to line 132D. On the other hand, if any of the lower serial priority stations is actually locked with the store, a station of higher priority cannot intervene until the locked station completes its operating sequence. Condition priority thereby overrides serial priority in station sequence operation.

In the above description it was assumed at the start of the operation that the coil 104A would be energized through its holding contact 109A, in the condition in which the above description left it. If, for any reason, the relay 105A should have dropped out at the end of the preceding sequence, the operation of push-button 116 will, through its contact 117, energize coil 104A to actuate relay 105A into closed position.

Should an operator desire to return an old card without making a request for a new card, he opens all of his switches 101 thus closing the circuit through the switches 103. When thereafter he initiates an operation at his station by closure of his start push-button, the old card will be returned to the store and the wedges 31, and 32 will operate as before but, in this case, when the switch 64A momentarily closes contacts 86A, coil 111A will be shorted out, thus opening contact 113A and terminating the sequence.

It will therefore be seen that the present invention provides a fully automatic sequence of operation at a delivery station under the control of the X directional movement. It further provides multi-station access into a common store of card items so that a number of operators can be viewing or otherwise using cards withdrawn from the store at the various stations at the same time. The invention further provides for both condition priority and serial priority interlocking to prevent conflicting operation of the station mechanisms and to establish an order of priority for locking to the store. At the same time each station may address a new card by its switches 101 without waiting for the completion of the sequence of an acting station. Likewise, the start button of a waiting station may be closed at any time and its relay 110 will close and be held in to automatically initiate an operating cycle when the previous station completes its sequence.

While certain preferred embodiments of the invention have been specifically illustrated and described it will be understood that the invention is not limited thereto as many variations will be apparent to those skilled in the art and the invention is to be given its broadest interpretation within the terms of the following claims.

I claim:

1. A random access storage and retrieval device for card-type items comprising: storage means for holding a plurality of said items in side-by-side relation; selector means adjacent the forward edge of said storage means for addressing a single one of said items; means for effecting relative movement transversely between said storage means and said selector means to identify and partially withdraw an addressed item from the storage means; sensor means on the downstream side of said selector means with respect to said relative movement for identifying the location of a selected item thereat; an item delivery station; means responsive to said sensor for stopping said relative movement with the selected item in said delivery station; an item manipulator at said station for withdrawing a selected item from the storage means and for returning it thereto; means for reciprocating said item manipulator between inner and outer positions; means for initiating a station operating sequence when said item manipulator is in its outer position; and means for thereafter automatically and sequentially moving said item manipulator inwardly to return an old item to the storage means, effecting said relative movement to select a new item and locate it at the delivery station, and moving said manipulator outwardly to withdraw the new item from the storage means.

2. The random access storage and retrieval device defined in claim 1 including a plurality of stations associated with a common storage means for independent access to the items therein, said stations having similar means for independently performing the defined sequence of item manipulation, and means interlocking said stations to prevent operation of a second station while another station is conducting a sequence of item manipulation.

3. The random access storage and retrieval device defined in claim 1 including a plurality of stations associated with a common storage means for independent access to the items therein, said stations having similar means for independently performing the defined sequence of item manipulation; and means providing for priority of access to said storage means when more than one station attempts to secure access thereto at the same time, a station of higher priority initiating its sequence of operation and preventing operation of a station of lower priority until the higher priority station has completed its sequence.

4. The random access storage and retrieval device defined in claim 1 including a plurality of stations associated with a common storage means for independent access to the items therein, said stations having similar means for independently performing the defined sequence of item manipulation; means interlocking said stations to prevent operation of a second station when another station is conducting a sequence of item manipulation; and means providing for priority of access to said storage means when more than one station attempts to secure access thereto at the same time, the station of higher priority initiating its sequence of operation and preventing operation of the station of lower priority until the higher priority station has completed its sequence.

5. The random access storage and retrieval device defined in claim 2 including means at each station for addressing an item in said storage means regardless of another station conducting a sequence of item manipulation so that the next station can start its sequence immediately after the preceding sequence terminates.

6. The random access storage and retrieval device defined in claim 1 including a plurality of stations associated with a common storage means for independent access to the items therein, said stations having similar means for independently performing the defined sequence of item manipulation, the means for effecting said relative movement also being common to all said stations, said automatic means including switching means operated by said item manipulator at its opposite extremes for effecting control functions.

7. The random access storage and retrieval device defined in claim 1 including means at said delivery station for separating the stored items to facilitate the insertion and withdrawal of an item therebetween; and means for coordinating the movements of said separating means with the relative movement between the storage means and the selector means and the movement of said item manipulator so that said relative movement is effected only when said separating means are withdrawn from the storage means, and said item manipulator moves only when said separating means are separating the items in the storage means.

8. The random access storage and retrieval device defined in claim 1 including a pair of multi-pole limit switches for performing control functions; means for operating one of said limit switches when the item manipulator approaches its inner position; and means for operating the other of said limit switches when said item manipulator approaches its outer position.

9. The random access storage and retrieval device defined in claim 7 including switching means operable when said item manipulator approaches both its inner and outer positions for de-energizing said means for reciprocating said item manipulator and for energizing means for withdrawing said item separating means from the storage means.

10. The random access storage and retrieval device defined in claim 1 including a plurality of stations associated with a common storage means for independent access to the items therein, said stations having similar means for independently performing the defined sequence of item manipulation; means providing condition priority interlocking between said stations to prevent operation of a second station while another station is conducting a sequence of item manipulation; means providing serial priority interlocking between said stations whereby a station of higher priority has access to the storage means before a station of lower priority when more than one station attempts to secure access thereto at the same time; and means whereby the condition priority overrides the serial priority interlock to require completion of a sequence of item manipulation at an operating station regardless of its priority rating should a station of a higher priority attempt to secure access to the storage means while the lower priority station is in operation.

11. The random access storage and retrieval device defined in claim 7 including a plurality of stations associated with a common storage means for independent access to the items therein, said stations having similar means for independently performing the defined sequence of item manipulation, said automatic sequencing means including means terminating the sequence with the item manipulator in its outer position and the item separating means withdrawn from the storage means whereby another station can operate to perform a sequence of item manipulation thereat.

12. The random access storage and retrieval device defined in claim 11 including interlock means between said stations preventing operation of a second station while another station is conducting a sequence of item manipulation, and in which said automatic sequencing means at the termination of the sequence operates said interlocking means to provide for operation of any of the stations with respect to said common storage means.

13. The random access storage and retrieval device defined in claim 12 including station interlocking means providing for priority order of access among the stations when more than one station attempts to secure access thereto at the same time whereby a station of higher priority will initiate its sequence of operation and prevent operation of a station of lower priority until the higher priority station has completed its sequence.

14. A random access storage and retrieval device for card-type items comprising: storage means for holding a plurality of said items in side by side relation; a plurality of delivery stations associated with said common storage means for independent access thereto; means associated with each delivery station for addressing an item in the storage means, identifying the addressed item, and delivering it to the delivery station; an item manipulator at each station for withdrawing a selected item from the storage means and returning it thereto; and means interlocking said stations to prevent operations of a second station while another station is conducting a sequence of item manipulation.

15. The random access storage and retrieval device defined in claim 14 including means at each station for addressing an item in said storage means regardless of another station conducting a sequence of item manipulation.

16. The random access storage and retrieval device defined in claim 14 including means providing for priority order of access to the storage means when more than one station attempts to secure access thereto at the same time, a station of higher priority initiating its sequence of operation and preventing operation of a station of lower priority until the higher priority station has completed its sequence, the interlocking means of claim 14 preventing operation of a second station regardless of the priority order of an operating station while it is conducting a sequence of item manipulation.

17. The random access storage and retrieval device defined in claim 16 including means at each station for addressing a desired item regardless of another station conducting a sequence of item manipulation, whereby the next station can initiate its own sequence immediately on termination of the sequence of said another station.

References Cited

UNITED STATES PATENTS

| | | | |
|---|---|---|---|
| 2,965,291 | 12/1960 | Hayes et al. | 235—61.7 |
| 3,158,844 | 11/1964 | Bowdle | 340—174.1 |
| 3,308,830 | 3/1967 | Irasek | 129—16.1 |
| 3,335,264 | 8/1967 | Madden | 235—61.11 |

PAUL J. HENON, *Primary Examiner.*

RAULFE B. ZACHE, *Assistant Examiner.*

U.S. Cl. X.R.

129—16.1; 340—174.1

PO-1050
(5/69)

UNITED STATES PATENT OFFICE
CERTIFICATE OF CORRECTION

Patent No. 3,438,000 Dated April 8, 1969

Inventor(s) EUGENE H. IRASEK

It is certified that error appears in the above-identified patent and that said Letters Patent are hereby corrected as shown below:

Column 8, line 66, Claim 6, after "extremes" the words -- of movement -- should be inserted.

SIGNED AND SEALED
MAR 10 1970

(SEAL)
Attest:

Edward M. Fletcher, Jr.
Attesting Officer

WILLIAM E. SCHUYLER, JR.
Commissioner of Patents